(12) United States Patent
Savage, Jr.

(10) Patent No.: US 6,779,929 B1
(45) Date of Patent: Aug. 24, 2004

(54) LENS UNIT AND FIBER OPTIC CABLE ASSEMBLY

(76) Inventor: John M. Savage, Jr., 538 B. Via De La Valle, Solana Beach, CA (US) 92075

( * ) Notice: Subject to any disclaimer, the term of this patent is extended or adjusted under 35 U.S.C. 154(b) by 0 days.

(21) Appl. No.: 09/575,522

(22) Filed: May 23, 2000

(51) Int. Cl.$^7$ .................................................. G02B 6/42
(52) U.S. Cl. ........................................ 385/92; 385/88
(58) Field of Search ............................ 385/31, 33–35, 385/36, 37, 53, 60–63, 78, 79, 81, 88, 92, 93, 133, 147

(56) References Cited

U.S. PATENT DOCUMENTS

| | | | | |
|---|---|---|---|---|
| 4,718,744 A | * | 1/1988 | Manning | 385/79 |
| 5,368,503 A | * | 11/1994 | Savage, Jr. | 439/502 |
| 5,440,658 A | * | 8/1995 | Savage, Jr. | 385/79 |
| 5,466,174 A | * | 11/1995 | Savage, Jr. | 439/596 |
| 5,548,676 A | * | 8/1996 | Savage, Jr. | 385/92 |
| 5,732,176 A | * | 3/1998 | Savage, Jr. | 385/92 |
| 5,818,995 A | * | 10/1998 | Savage, Jr. | 385/92 |
| 6,256,445 B1 | * | 7/2001 | Jennings et al. | 385/135 |
| 6,264,376 B1 | * | 7/2001 | Savage, Jr. | 385/88 |
| 6,302,595 B1 | * | 10/2001 | Vilgiate et al. | 385/88 |

* cited by examiner

*Primary Examiner*—John D. Lee
(74) *Attorney, Agent, or Firm*—William W. Haefliger

(57) ABSTRACT

A device for transmitting light, comprising, in combination, a fiber optics cable having light entrance and light exit ends, structure including a body receiving the entrance end of the light pipe for positioning said entrance end to receive light, said structure including a receiver in the body, and at least one anchor carried by said structure to attach the structure to a mounting board, for positively positioning said structure, and said body and receiver, relative to the board.

34 Claims, 3 Drawing Sheets

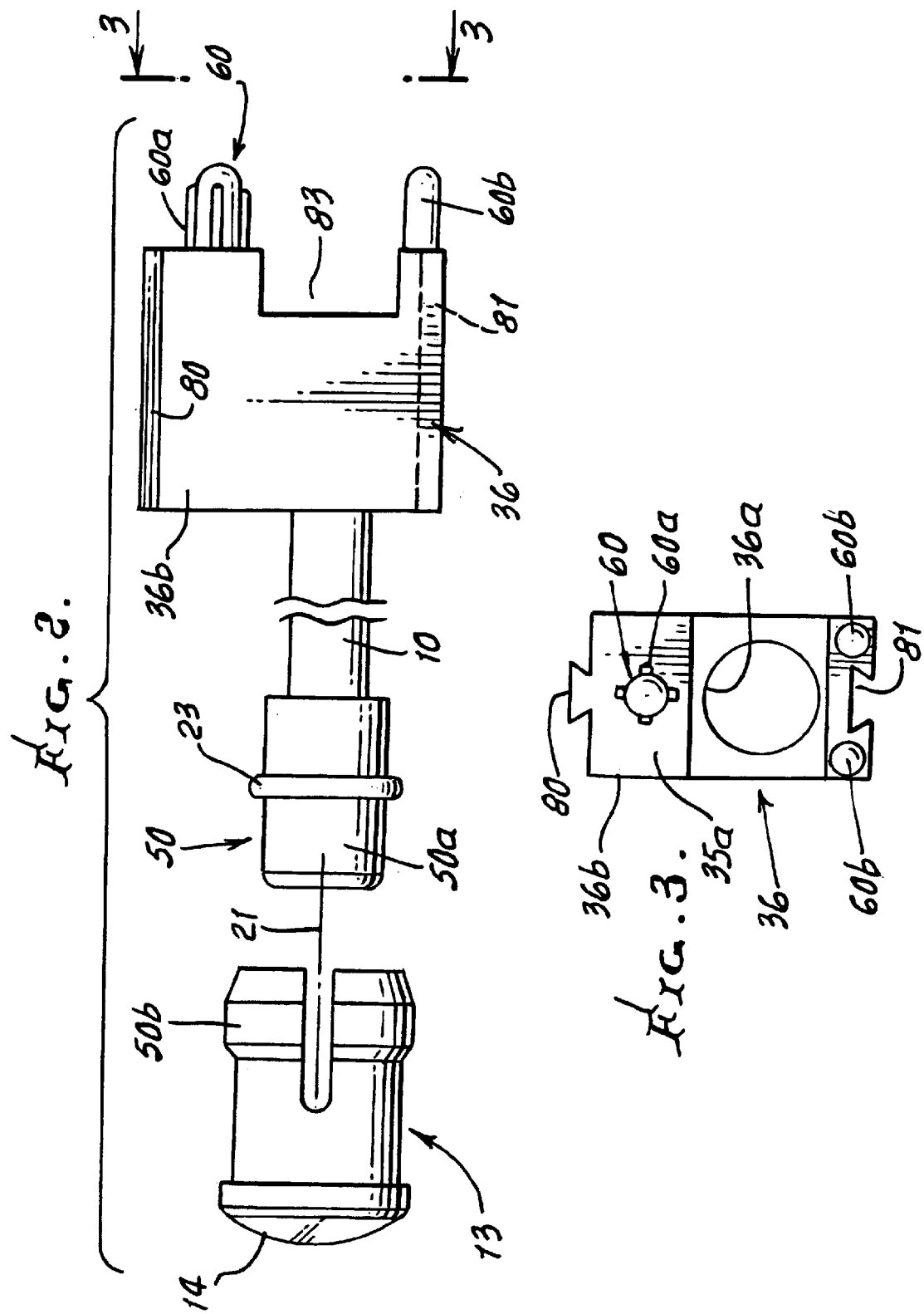

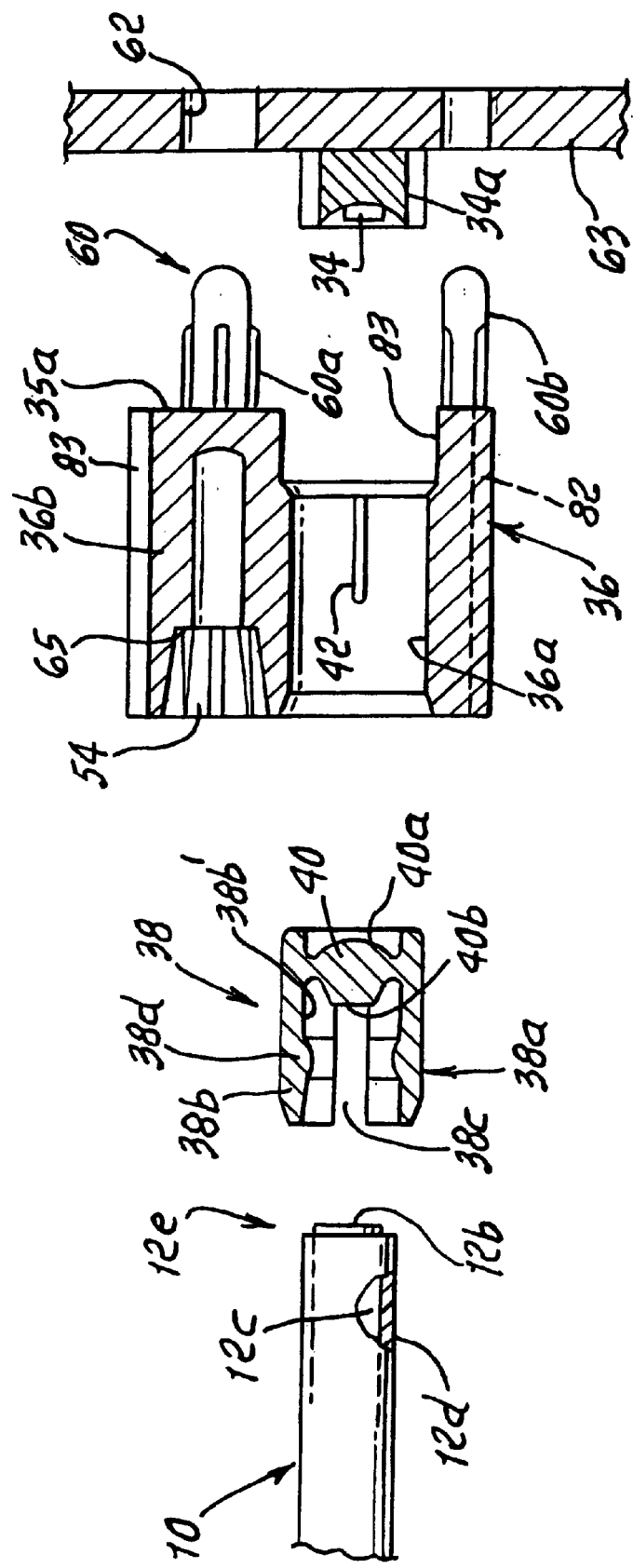

LENS UNIT AND FIBER OPTIC CABLE ASSEMBLY

BACKGROUND OF THE INVENTION

This invention relates generally to optical coupling of light sources and fiber optics cables, or light pipes; and more particularly concerns optical coupling of lens units and light fibers in such a way as to position the cable to receive light transmission from a light source spaced endwise from the light source, such as an LED.

There is need for improved apparatus and method to overcome difficulties in optical coupling as between light sources, light pipes and lenses.

SUMMARY OF THE INVENTION

IT is a major object of the invention to provide improvements in such optical coupling as will meet the referenced need. Basically a light transmission device in accordance with the invention comprises:

a) a fiber optics cable having light entrance and light exit ends, b) structure including a body receiving the entrance end of the light pipe for positioning the entrance the to receive light, c) the structure including a receiver in the body, d) and at least one anchor carried by the structure to a mounting board, for positively positioning the structure, body and receiver, relative to the board.

It is another important object to provide a portion of the structure to be sidewardly offset relative to the receiver, the one anchor being in substantial alignment with the portion of the structure, and there being a shoulder on said one portion of the structure in substantial alignment with the anchor to receive pushing force transmission from a tool to drive the anchor toward an opening in said board.

Another object is to provide a tool receiving recess in said structure, the shoulder being associated with that recess.

A further object is to provide a light focusing and transmitting lens located in the structure in alignment with the entrance end of the light pipe.

In this regard the lens and receiver are preferably unitary, for simplicity; and the light source is preferably in the form of an LED located in a cavity in the body, in alignment with the receiver.

Yet another object is to provide multiple of the anchors projecting from a mounting surface defined by said structure, the anchors offset from an axis defined by the receiver, totally support the structure.

An additional object is to provide the body to have multiple sides, two of which form tongue and groove configurations to receive corresponding groove and tongue elements of adjacently mounted bodies.

Yet another is to provide a lens unit at the light exit end of the cable; the lens unit preferably having a light transmitting end wall, and a side wall extending away from that end wall, the cable light exit end retained in assembled relation to that side wall, whereby light is transmitted from the cable exit end to said lens unit end wall.

A yet additional object includes provision of a tubular retainer receiving the light exit end of the cable, the tubular retainer assembled to the lens unit side wall. That side wall preferably has multiple spring fingers, and said retainer and fingers have interlocking relation. The retainer and fingers typically have tongue and groove interlocking relation. As will be seen, the retainer preferably has an exterior flange or ring, and at least one of said fingers has a groove receiving at least part of the flange.

Further, the spring fingers preferably have cam surfaces thereon to be spread apart in response to axial movement of the retainer relative to the spring fingers.

A yet further object includes a support panel carrying said LED, and another support panel supporting said lens unit said panels spaced apart in fixed relation.

An additional object is to provide:

a) a fiber optics cable having light entrance and light exit ends, b) a lens unit at the light exit end of the cable, said unit having a light transmitting end wall, a side wall extending away from said end wall, the cable light exit end retained in assembled relation to said side all, whereby light is transmitted from the cable exit and to said lens unit end wall, c) and a tubular retainer receiving said light exit end of the cable, to position the cable exit end relative to the unit end wall whereby that end wall is substantially fully illuminated by light from the cable, the tubular retainer assembled to said side wall.

As will be seen, the side wall and cable (or light pipe) exit end may have interlocking relation; the side wall may provide multiple retention fingers; the retainer may have an exterior flange, and at least one of the finger may have a groove receiving at least part of the flange; and the fingers may have cam surfaces to be deflected in response to axial movement of the retainer relative to the fingers. Also, the retainer position the cable exit end relative to the lens unit end wall, whereby that end wall is substantially fully illuminated by light from the cable exit end.

Further objects include provision of a light focusing and transmitting lens located in said structure in alignment with said entrance and of the light pipe; the lens having a substantially flat light exit surface to align with the cable core; the cable having a plastic jacket surrounding said core, said jacket retained to a bore defined by the receiver; and cable retention elements on the receiver that carries the lens and receives the cable entrance end.

These and other objects and advantages of the invention, as well as the details of an illustrative embodiment, will be more fully understood from the following specification and drawings, in which:

DRAWING DESCRIPTION

FIG. 2 is an exploded side view of elements of the invention;

FIG. 3 is an end view taken on lines 3—3 of FIG. 2; and

FIG. 4 is an exploded view of structure at the light entrance end of the cable.

DETAILED DESCRIPTION

Figure 1:
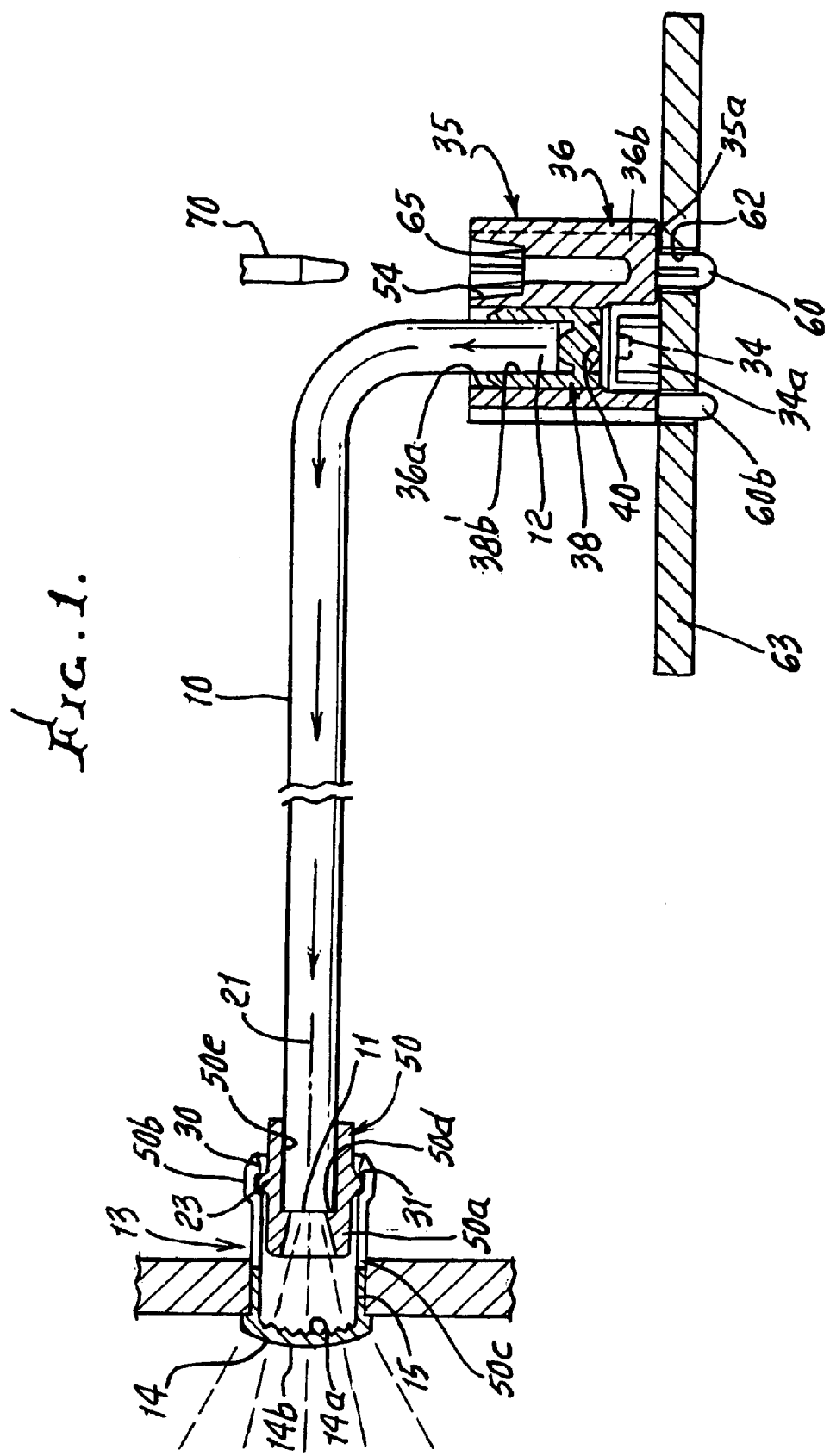
FIG. 1 is a section taken in elevation to show elements of the invention.

In FIG. 1, an optical pipe cable 10 has opposite ends 11 and 12. End 11 is endwise received leftwardly into a tubular retainer 50 which is in turn received into a lens unit 13 to be fixedly positioned coaxially relative to that unit. The lens unit has a light transmitting end wall 14, or lens, and a skirt 15 integral with that end wall and extending axially rightwardly. The end 11 of the pipe 10 directly faces 14, which has facets 14*a* on the end wall interior face to receive and diffuse light transmitted axially by the cable. Note the leftwardly convex outer 14b of the lens wall 14, to transmit light as in divergent directions as indicated.

The lens unit skirt 15 has structure extending away from end wall 14 generally axially rightwardly, and sidewardly of the retainer side wall 50a. That structure may be considered as including retention structure, as in the form of like retention fingers 50b (which may be spring fingers) spaced about the axis 21. Four such fingers may be provided. Those fingers have leftward ends 50c integral with and projecting rightwardly from skirt 15, as shown, and rightward ends to be yieldably resiliently spread apart as the retainer is assembled leftwardly into the lens unit, facilitating ready intercoupling of the cable 10 and lens unit 13, in intercoupled relation, as for example in tongue and groove snap fit relation, precisely coaxially positioning these elements. The cable left end portion fits into the bore 50e of 50, as by an interference fit, for retention. The rightward end of bore 50e may be slightly flared for ease of reception of the cable and portion. A retainer shoulder 50d stops the left end of the cable. Accordingly, the cable light exit end is positioned relative to end wall 14 to direct exiting light to substantially fully illuminate wall 14. Light may diverge or flare between the cable end and wall 14, to achieve such illumination.

As shown, the retainer has an integral exterior flange 23 in the form of a ring extending about axis 21, and the fingers have grooves 26 into which the flange is received upon assembly. The groove lengths match the flange length, so that the cable is held in coaxial relation to the lens unit. In that position the flared bore 50e of the retainer passes light to all, or substantially all, the facets 14a.

Longitudinally extending gaps are typically formed circumferentially between successive spring fingers, and a protrusion may be provided on the flange 23 to extend radially outwardly into one of such gaps. Its sideward engagement with one of the fingers blocks relative rotation of the cable and lens unit, about axis 21. The fingers have cam surfaces thereon to be spread apart upon relative axial movement of the pipe relative to the fingers. As shown there are certain cam surfaces 30 that are divergent in a direction away from the lens unit end wall 14; and there are other cam surfaces 31 that are convergent in a direction toward the lens unit end wall. Surfaces 30 are spread apart as the retainer is pushed endwise into the lens unit, and surfaces 31 are spread apart when the retainer is displaced endwise away from the lens unit 13.

FIGS. 1 and 4 also show a light source such as LED 34 spaced axially from the end 12b of the cable, and directed toward that end. Accordingly, when LED 34 is "ON", light is transmitted to and through the cable, and through the end wall 14 of lens unit 13.

Structure 35, including a body 36, receives the light entrance end 12e of the cable 10, for positioning that entrance end to receive light. Body 36 has a bore 36a into which the light entrance end of the cable is received, for positioning that entrance end to receive light from the LED. Structure 35 preferably also includes a receiver 38 received in body bore 36a, as shown. The receiver has a sleeve portion 38a defining a bore 38b' into which the cable end is received and retained, as for example by an interference fit, or by a bonding layer.

A light transmitting lens 40 is located, in the structure 35 in axial alignment with the LED and with the light entrance end 12b of the cable.

A light transmitting lens 40 is located, in the structure 35 in axial alignment with the LED and with the light entrance end 12b of the cable. Lens 40 may consist of synthetic resin, and be molded integrally with the receiver 38. That lens has a light entrance end 40a that is convex toward the LED 34, and a light discharge end 40b that is flat to flatly engage and position or stop the end 12b of the cable. The lens acts as a focusing lens to efficiently gather and transmit light from the LED to direct it axially into the central or core portion 12c of the cable containing light transmitting fibers. That core portion is surrounded by a plastic jacket 12d which may be heat bonded to the bore of the plastic receiver 38. The receiver 38 may advantageously have a sleeve portion 38a defining cantilevered spring fingers 38b separated by a slot or slots 38c, and convex protrusions 38d that engage the jacket 12d, to assist in cable retention. Ribs 42 on the body bore 36a frictionally engage the outer surface of sleeve portion 38a to aid in retaining it in position.

At least one another carried by the body 36 attaches to a mounting board, for positively positioning said structure, said body and receiver, relative to the board. See for example pin 60 projecting downwardly from the flat lower surface 35a of the structure 35, to penetrate through a locating opening 62 in board 63. Ribs 60a on pin 60 frictionally retain it to opening 62. Pins or pegs 60b can be heat staked to the PCB 63.

A portion 36b of body 36 of structure 35 is sidewardly offset relative to the receiver, said one anchor 60 being in alignment with said portion 36b of the body. A shoulder 65 on said portion 36b of said structure is in alignment with the anchor pin to receive pushing force transmission from a tool indicating at 70 to drive said anchor toward opening 62 in board 63.

A tool receiving recess 54 is formed in the upper portion of body portion 36b, and the shoulder 65 is associated with recess 36b.

Preferably, multiple of such anchors may be provided, projecting from a mounting surface three-point stability when they fit in the openings provided in panel 35.

Finally, body 36 has block shape, and has multiple sides, two of said sides forming tongue and groove configurations to receive corresponding groove and tongue elements of adjacently mounted bodies. See for example dove-tailed tongue 80 on the body side, and dove-tailed groove 81 on the opposite body side. Cut-out 83 in the body 36 is adapted to receive the LED 34, and structure 34a associated with the LED. As shown in FIGS. 1 and 4, the entirety of LED 34 is spaced away from board 63.

Accordingly, a very simple effective apparatus is provided for stably supporting opposite ends of a fiber optics cable, in end abutting and aligning relation to the cable, for light transmission. Ready connection and disconnection of the cable opposite ends to and from the board 63 and to and from the lens unit 13, are afforded.

I claim:

1. A device for transmitting light, comprising, in combination,
   a) a fiber optics cable having light entrance and light exit ends,
   b) structure including a body for positioning said entrance end to receive light,
   c) said structure including a receiver carried by the body and receiving the entrance end of the cable,
   d) and at least one anchor carried by said structure to attach the structure to a mounting board, for positively positioning said structure, and said body and receiver, relative to the board,
   e) a light focusing and transmitting lens located in said structure in alignment with said entrance end of the light pipe, said lens associated with said receiver and the cable having a light transmitting core in alignment with a substantially flat light transmitting surface of the lens, the lens and receiver being unitary, and the cable having a plastic jacket surrounding said core said jacket retained to a bore defined by the receiver, f) and including a cavity in the receiver in alignment with said lens receiving a light source in the form of an LED, and including said mounting board, the entirety of the LED spaced from the mounting board.

2. The combination of claim 1 wherein a portion of said structure is sidewardly offset relative to the receiver, said one anchor being in substantial alignment with said portion of said structure, and there being a shoulder on said one portion of said structure in substantial alignment with said anchor to receive pushing force transmission form a tool to drive the anchor toward an opening in the board.

3. The combination of claim 2 wherein there is a tool receiving recess in said structure, said shoulder being associated with said recess.

4. The combination of claim 1 including said light source in the form of an LED, in said cavity.

5. The combination of claim 1 wherein there are multiple of said anchors projecting from a mounting surface defined by said structure, said anchors offset from an axis defined by the receiver.

6. The combination of claim 5 wherein there are three of said anchors.

7. The combination of claim 1 wherein said body has multiple sides, two of said sides forming tongue and groove configurations to receive corresponding groove and tongue elements of adjacently mounted bodies.

8. The combination of claim 1 including a lens unit at the light exit end of the cable.

9. The combination of claim 8 wherein said lens unit has a light transmitting end wall, a side wall extending away from said end wall, the cable light exit and retained in assembled relation to said side wall, whereby light is transmitted from the cable exit end to said lens unit end wall.

10. The combination of claim 9 including a tubular retainer receiving said light exit end of the cable, the tubular retainer assembled to said side wall.

11. The combination of claim 10 wherein said side wall and said cable light exit end have interlocking relation.

12. The combination of claim 10 wherein said side wall has multiple spring fingers, and said retainer and fingers have interlocking relation.

13. The combination of claim 12 wherein said retainer and fingers have tongue and groove interlocking relation.

14. The combination of claim 12 wherein said retainer has an exterior flange, and at least one of said fingers has a groove receiving at least part of said flange.

15. The combination of claim 9 wherein said end wall has an inner face directed axially toward said cable light exit end, said inner face having facets.

16. The combination of claim 12 wherein said spring fingers have cam surfaces thereon to be spread apart in response to axial movement of the retainer relative to the spring fingers.

17. The combination of claim 16 wherein said cam surfaces are divergent in a direction away from said lens unit end wall.

18. The combination of claim 16 wherein said cam surfaces are convergent in a direction away from said lens unit end wall.

19. The combination of claim 12 wherein the retainer has a substantially cylindrical side surface in closely spaced relation to said spring fingers.

20. The combination of claim 8 including a panel carrying said lens unit.

21. The combination of claim 8 wherein said cable light entrance end is spaced from said unit end wall, and including an LED facing and spaced from said cable light entrance end to transmit light into the cable via said entrance end.

22. The combination of claim 1 including a bore defined by the body, the receiver extending in said bore and retained to said core.

23. The combination of claim 22 including retention ribs on one of said bore and receiver.

24. A device for transmitting light, comprising, in combination, a) a fiber optics cable having light entrance and light exit ends, b) a lens unit at the light exit end of the cable, said unit having a light transmitting end wall, a side wall extending away from said end wall, the cable light exit end retained in assembled relation to said side wall, whereby light is transmitted from the cable exit end to said lens unit end wall, c) a tubular retainer receiving said light exit end of the cable, to position the cable exit end relative to the unit end wall whereby that end wall is substantially fully illuminated by light form the cable, the tubular retainer assembled to said side wall, d) said cable light entrance end spaced from said unit, and including an LED facing and spaced from said cable light entrance end to transmit light into the cable via said entrance end, e) there being a receiver carrying the LED and a support board carrying the receiver, the entirety of the LED spaced from the support board.

25. The combination of claim 24 wherein said side wall and said cable light exit end have interlocking relation.

26. The combination of claim 24 wherein said side wall has multiple retention fingers, and said retainer and fingers have interlocking relation.

27. The combination of claim 25 wherein said retainer has an exterior flange, and at least one of said fingers has a groove receiving at least part of said flange.

28. The combination of claim 24 wherein said end wall has an inner face directed axially toward said cable light exit end, said inner face having facets.

29. The combination of claim 26 wherein said fingers have cam surfaces thereon to be spread apart in response to axial movement of the retainer relative to the fingers.

30. The combination of claim 29 wherein said cam surfaces are divergent in a direction away from said lens unit end wall.

31. The combination of claim 29 wherein said cam surfaces are convergent in a direction away from said lens unit end wall.

32. The combination of claim 26 wherein the retainer has a substantially cylindrical side surface in closely spaced relation to said spring fingers.

33. The combination of claim 24 including a panel carrying said lens unit.

34. The device of claim 24 including a support board carrying said LED, and another support panel supporting said lens unit, said panels spaced apart in fixed relation.

* * * * *